United States Patent [19]
Weirich

[11] 4,149,567
[45] Apr. 17, 1979

[54] MULTI-CORE HYDRAULIC DUCT

[75] Inventor: Walter Weirich, Dortmund, Fed. Rep. of Germany

[73] Assignee: Gewerkschaft Eisenhutte Westfalia, Lunen, Fed. Rep. of Germany

[21] Appl. No.: 868,950

[22] Filed: Jan. 12, 1978

[30] Foreign Application Priority Data

Jan. 13, 1977 [DE] Fed. Rep. of Germany ....... 7700786

[51] Int. Cl.² .............................................. F16L 9/18
[52] U.S. Cl. .................................... 138/111; 138/155; 138/173
[58] Field of Search ............... 138/111, 143, 173, 155, 138/114, 142, 113

[56] References Cited

U.S. PATENT DOCUMENTS

| 1,124,299 | 1/1915 | Cosad et al. | 138/173 |
| 3,044,256 | 7/1962 | Bayly et al. | 138/143 |
| 3,425,455 | 2/1969 | Kilpert et al. | 138/143 |
| 3,529,632 | 9/1970 | Johns | 138/111 |
| 3,557,839 | 1/1971 | Uto et al. | 138/143 |
| 3,590,855 | 7/1971 | Woollen et al. | 138/111 |

Primary Examiner—Richard E. Aegerter
Assistant Examiner—L. Footland
Attorney, Agent, or Firm—Sughrue, Rothwell, Mion, Zinn and Macpeak

[57] ABSTRACT

A multi-core duct is constituted by a plurality of resilient conduits bunched together within a protective sleeve. Each of the conduits is formed from a high-strength synthetic plastics material and the protective sleeve is made of a flame-resistant synthetic plastics material.

5 Claims, 2 Drawing Figures

MULTI-CORE HYDRAULIC DUCT

BACKGROUND OF THE INVENTION

This invention relates to a multi-core hydraulic duct and in particular to such a duct which carries high pressure hydraulic fluid for hydraulic systems in underground mine workings.

A multi-core duct usually consists of a plurality of hydraulic conduits bunched together within a flexible protective sleeve. Such high pressure multi-core ducts are used in mine workings primarily for the supply of pressure medium to, and the hydraulic control of, a hydraulically advanceable mine roof support assembly in for example, a longwall working. The conduits themselves are flexible, and the protective sleeve is usually constituted by a spring steel strip which is wound helically around the bunch of conduits. Such a multicore high-pressure duct is relatively heavy and is too stiff to bend as required.

It is the aim of the invention to produce a multicore duct, especially for hydraulic mine roof support assemblies in underground mine workings, which does not suffer from these disadvantages.

SUMMARY OF THE INVENTION

The present invention provides a multi-core duct constituted by a plurality of resilient conduits bunched together, wherein each of the conduits is formed from a high-strength synthetic plastics material, and the duct is provided with a protective sleeve made of a flame-resistant synthetic plastics material.

Preferably, the protective sleeve is made of a synthetic plastics materials formed on a rubber base. A synthetic plastics material known in the trade as "Pertinan" (Registered Trade Mark) is especially suitable for making the protective sleeve. As a flame-resistant synthetic plastics material is used for the protective sleeve the conduits bunched in the protective sleeve may be made from a non-flame-resistant material or from a material that would normally not be considered adequately flame-resistant. Advantageously, however, the conduits are made of a material that has a substantially higher strength than that of the material forming the protective sleeve, and preferably, the conduits are made of a polyamide or a synthetic plastics material having similar physical properties. Hitherto, although such materials were suitable for high-pressure conduits, they could not be used in underground workings by reason of their inadequate flame-proof qualities. Conduits made from a polyamide can be used at maximum pressures of about 250 to 400 bars, and can be constructed with an internal diameter as small as 2 millimeters. Such thin conduits can be bunched together in relatively large numbers to form a multi-core duct within a synthetic plastics protective sleeve without the finished duct having an unacceptably large diameter or becoming too stiff and inconvenient for laying within a longwall working.

Advantageously, the protective sleeve is provided with an internal reinforcement, preferably of steel braid or the like, in order to increase its mechanical strength.

Preferably, the protective sleeve is clamped between a rigid inner support sleeve and an outer sleeve. Advantageously, the outer sleeve is provided with indentation which are directed towards the inner support sleeve, and preferably, the indentations are constituted by corrugations extending in the longitudinal direction of the protective sleeve.

The outer sleeve may be provided with a frustoconical extension whose free end carries a flange for the connection of a rotatable coupling piece.

BRIEF DESCRIPTION OF THE DRAWINGS

One form of multi-core duct constructed in accordance with the invention will now be described by way of example, with reference to the accompanying drawings, in which.

DESCRIPTION OF PREFERRED EMBODIMENT

Figure 1:
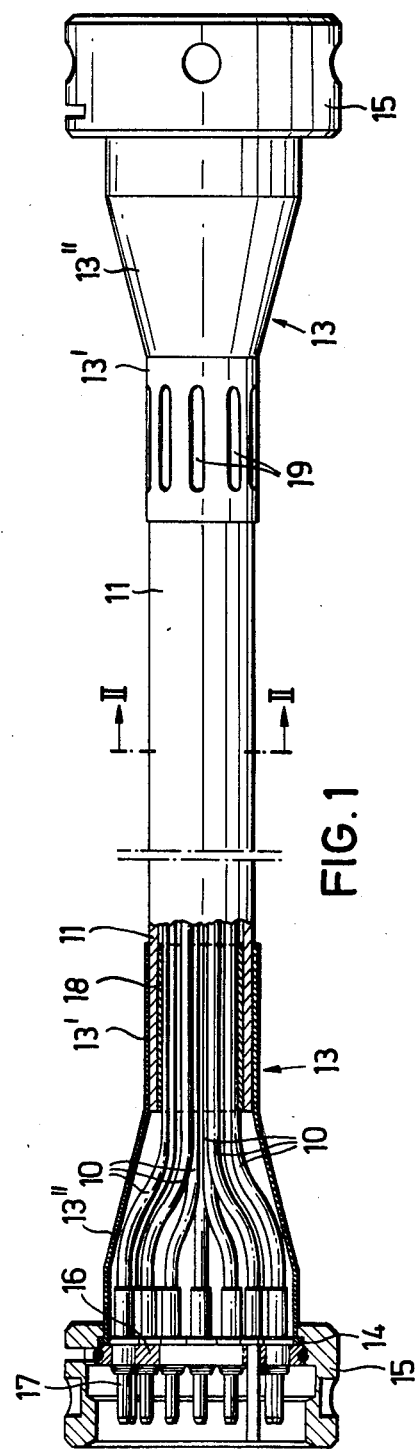
FIG. 1 is a part-sectional side elevation of the multi-core duct together with coupling devices provided on the duct ends.
Figure 2:
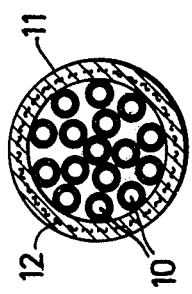
FIG. 2 is a cross-section taken on the line II—II of FIG. 1.

Referring to the drawings, FIG. 1 shows a multicore, high-pressure duct which comprises a bunch of sixteen conduits 10 covered by a protective sleeve 11. Each of the conduits 10 is made of a thin, flexible, high-strength synthetic plastics material such as a polyamide, the internal diameter of which is about 2 millimeters. The protective sleeve 11 is manufactured from a flame-resistant synthetic plastics material, preferably formed on a rubber base. The sleeve 11 is provided with an internal reinforcement 12, preferably of steel braid.

A metallic outer sleeve 13 is a force fit on each of the two ends of the protective sleeve 11. Each outer sleeve 13 comprises a cylindrical section 13' and a frusto-conical section 13" which encloses the conduits 10 as they emerge from the respective ends of the protective sleeve 11. Each of the cylindrical sections 13' of the outer sleeves 13 is clamped to the flexible protective sleeve 11. For this purpose, a rigid support sleeve 18 is introduced into each of the two ends of the protective sleeve 11 so as to support the ends of the protective sleeve from the interior. The cylindrical sections 13' of the outer sleeves 13 are each provided in the region of the inner support sleeves 18 with indentations 19 formed by longitudinally extending corrugations. These corrugations 19 reinforce the clamping of the protective sleeve 11 between the rigid support sleeves 18 and the sections 13' of the outer sleeves 13.

The conduits 10 are packed into a tight bundle within the protective sleeve 11, while within the frustoconical sections 13" of the outer sleeves 12 they diverge. Each of the outer sleeves 13 has at the end of its frustoconical section 13", an annular flange 14 which serves to retain a coupling device 15 of a plug-in coupling. The coupling devices 15 are each formed as a screw cap and each accommodates a holder disc 16 provided with sixteen apertures through which plug pins 17 secured to the ends of the conduits 10 extend. Each coupling device 15 is rotatable in relation to its outer sleeve 13, while the plug pins 17 are rotatable relative to their disc 16 but axially fixed relative thereto.

I claim:

1. A multi-core duct, comprising: a plurality of resilient conduits bunched together, each of the conduits being formed from a high-strength synthetic plastics material, a protective sleeve made of a flame-resistant synthetic plastics material surrounding the bunched conduits, a rigid inner support sleeve and an outer sleeve clamping each end of the protective sleeve, and a frustoconical extension provided on the outer sleeve, the free end of said extension having a flange for the connection of a rotatable coupling piece.

2. A multi-core duct according to claim 1, wherein the protective sleeve is made of a synthetic plastics material formed on a rubber base.

3. A multi-core according to claim 1, wherein the conduits are made of a polyamide.

4. A multi-core duct according to claim 1, wherein the outer sleeve is provided with indentations which are directed towards the inner support sleeve.

5. A multi-core duct according to claim 4, wherein the indentations are constituted by corrugations extending in the longitudinal direction of the protective sleeve.

* * * * *